UNITED STATES PATENT OFFICE.

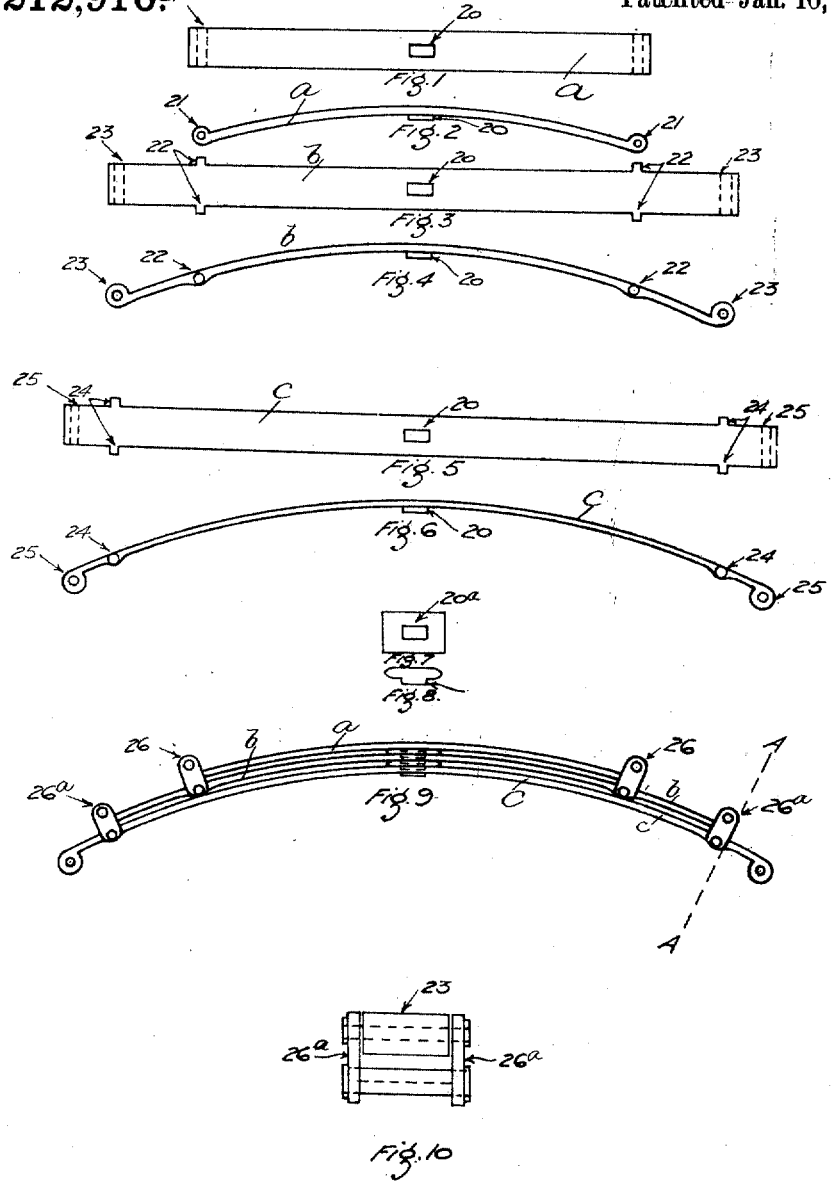

WILLIAM F. DELEHANTY, OF BOSTON, MASSACHUSETTS.

LEAF-SPRING.

1,212,916.  Specification of Letters Patent.  Patented Jan. 16, 1917.

Application filed February 12, 1916. Serial No. 77,942.

*To all whom it may concern:*

Be it known that I, WILLIAM F. DELEHANTY, of Boston, in the county of Suffolk and State of Massachusetts, have invented certain new and useful Improvements in Leaf-Springs, of which the following is a specification.

This invention relates to leaf springs such as are used in automobiles and other vehicles and has for its object to provide a novel connection between the individual leaves of the spring by which said leaves are held out of frictional engagement with each other thereby eliminating the excessive friction ordinarily incident to the use of leaf springs, and by which said leaves are each free to flex or yield when load is applied, so that the maximum resiliency of the spring is secured. I secure this end by pivotally connecting the ends of each of the shorter leaves of the spring to one of the longer leaves by a linkage connection which holds the leaves separated, but allows them to move relative to each other freely as the spring is flexed or bent. I also preferably provide spacing means at the central portion of the spring for holding the leaves separated at their central portion. All frictional contact between the leaves is thus eliminated.

In order to give an understanding of my invention I have illustrated in the drawings a selected embodiment thereof which will now be described, after which the novel features thereof will be pointed out in the appended claims.

Figure 1 is a plan view of the top leaf of the spring; Fig. 2 is a side edge view of the same; Fig. 3 is a top view of a leaf which is intermediate the top and bottom leaves; Fig. 4 is a side view of the same; Fig. 5 is a plan view of the bottom leaf; Fig. 6 is a side view of the same; Fig. 7 is a plan view of the spacing block by which the leaves are separated at the center; Fig. 8 is a side view of the same; Fig. 9 is a side view of a complete spring formed of a series of superposed leaves; Fig. 10 is a cross-section on the line A—A, Fig. 9.

My invention may be embodied in springs of different sizes and shapes and springs with any desired number of leaves. The spring shown in the drawing has three leaves $a$, $b$ and $c$ superposed one on the other, and each of the leaves is slightly curved. This particular shape, however, is not essential to the invention.

Each of the shorter leaves $a$ and $b$ is pivotally connected at each of its ends to a longer leaf by means of links which hold the leaves properly spaced. For instance, the shortest leaf $a$ is pivotally connected at its ends to the next longer leaf $b$ by means of links 26, and the ends of the leaf $b$ are in turn pivotally connected to the leaf $c$ by means of links $26^a$.

Any suitable manner of pivotally connecting the links to the leaves may be employed without departing from the invention. A convenient and practical structure is herein illustrated wherein the ends of the upper leaf $a$ are provided with upturned eyes 21 which receive bolts on which the upper ends of the links 26 are pivotally mounted. The lower ends of said links 26 are pivotally mounted on projections or lugs 22 extending laterally from the leaf $b$ adjacent the ends thereof. The leaf $b$ is also provided at its ends with upturned ears 23 which receive bolts on which the upper ends of the links $26^a$ are pivotally mounted, the lower ends of the links $26^a$ being pivotally connected to lugs or projections 24 extending laterally from the longer or main leaf $c$. The links are of such a length as to hold the leaves properly spaced from each other as shown. This link connection provides a pivotal connection between the leaves which not only holds them out of frictional engagement with each other, but it also provides a construction which allows each leaf to freely flex as load is applied so that the spring will have its maximum resiliency. A further advantage is that the link construction will prevent the ends of the leaves from separating when the spring recoils and will also hold the leaves in alinement.

I have also provided herein spacing blocks for holding the leaves separated at their central portion, these blocks being indicated at 15. The blocks and leaves are so constructed that they have an interlocking engagement with each other. The leaves $a$ and $b$ are provided on their under faces with projections 20 adapted to fit in recesses or sockets $20^a$ in the upper side of the spacing block 15, and each spacing block has on its under side a lug or projection 16, as best seen in Fig. 8, which sets into a socket 17 formed in the upper side of the leaf. The leaves are thus held spaced from each other by spacing means which are thus held interlocked with the leaves.

While I have illustrated a selected embodiment of my invention, I do not wish to be limited to the constructional features shown.

I claim:

1. A spring comprising a series of superposed leaves, all having terminal eyes and all save the upper one having lateral lugs, blocks separating the springs at the middle, and links applied pivotally to the said lugs and eyes, and thus connecting the end portions of the leaves, but holding them separated as described.

2. A spring comprising a series of superposed leaves, the upper two having their ends formed as upturned eyes, all the leaves except the upper one having lateral lugs, and links applied to said eyes and lugs, and thus pivotally connecting the end portions of the springs and holding them spaced apart, as described.

3. A spring comprising a series of superposed leaves of different lengths, and links pivotally connected to the ends of each of the shorter leaves and also pivotally connected to a longer leaf, said links being of such a length as to hold the ends of the leaves spaced from each other while permitting the leaves to freely flex as load is applied.

In testimony whereof I have affixed my signature, in presence of two witnesses.

WILLIAM F. DELEHANTY.

Witnesses:
 HENRY J. DIXON,
 JOHN J. HARTNETT.